United States Patent Office 2,780,733
Patented Feb. 5, 1957

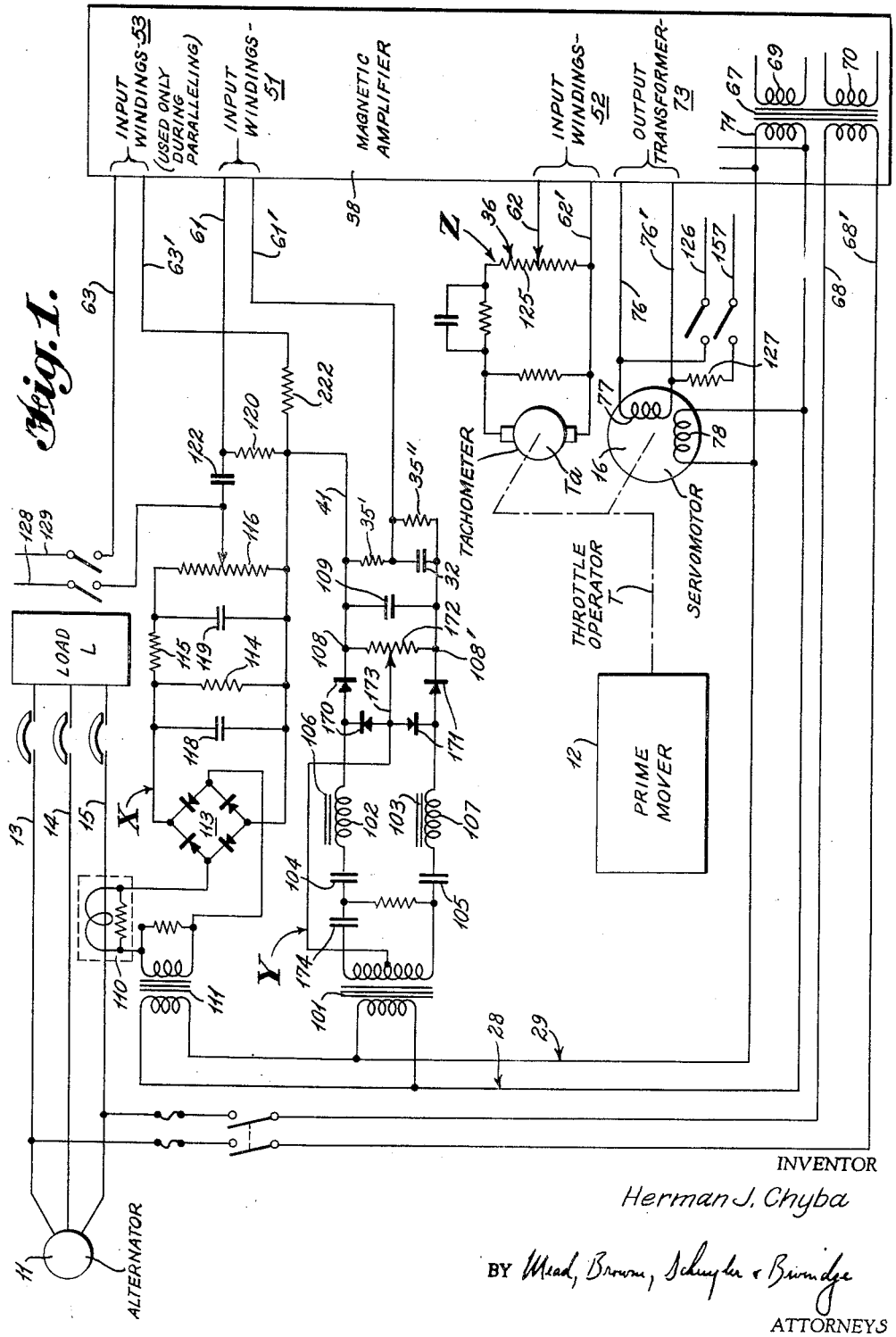

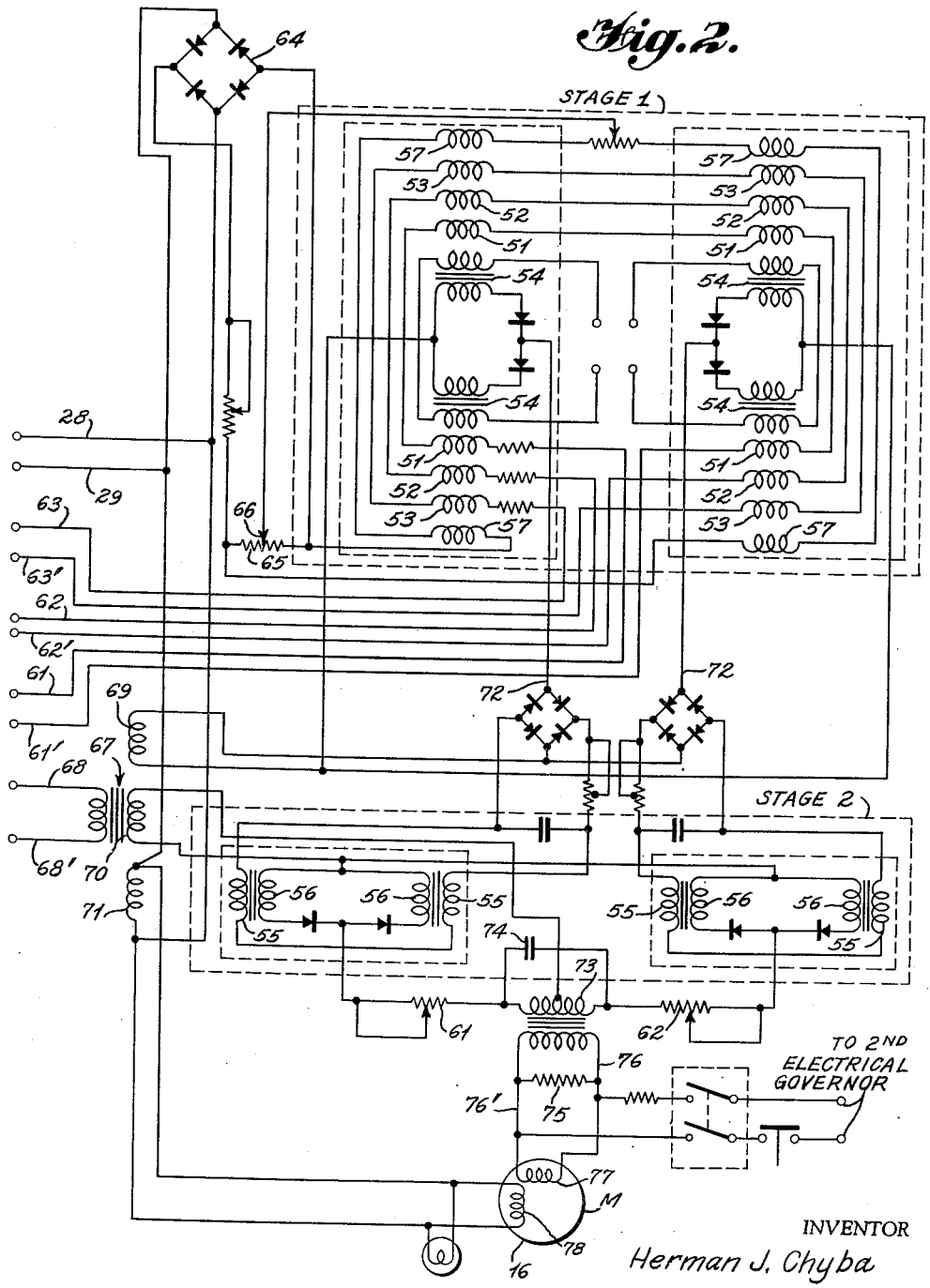

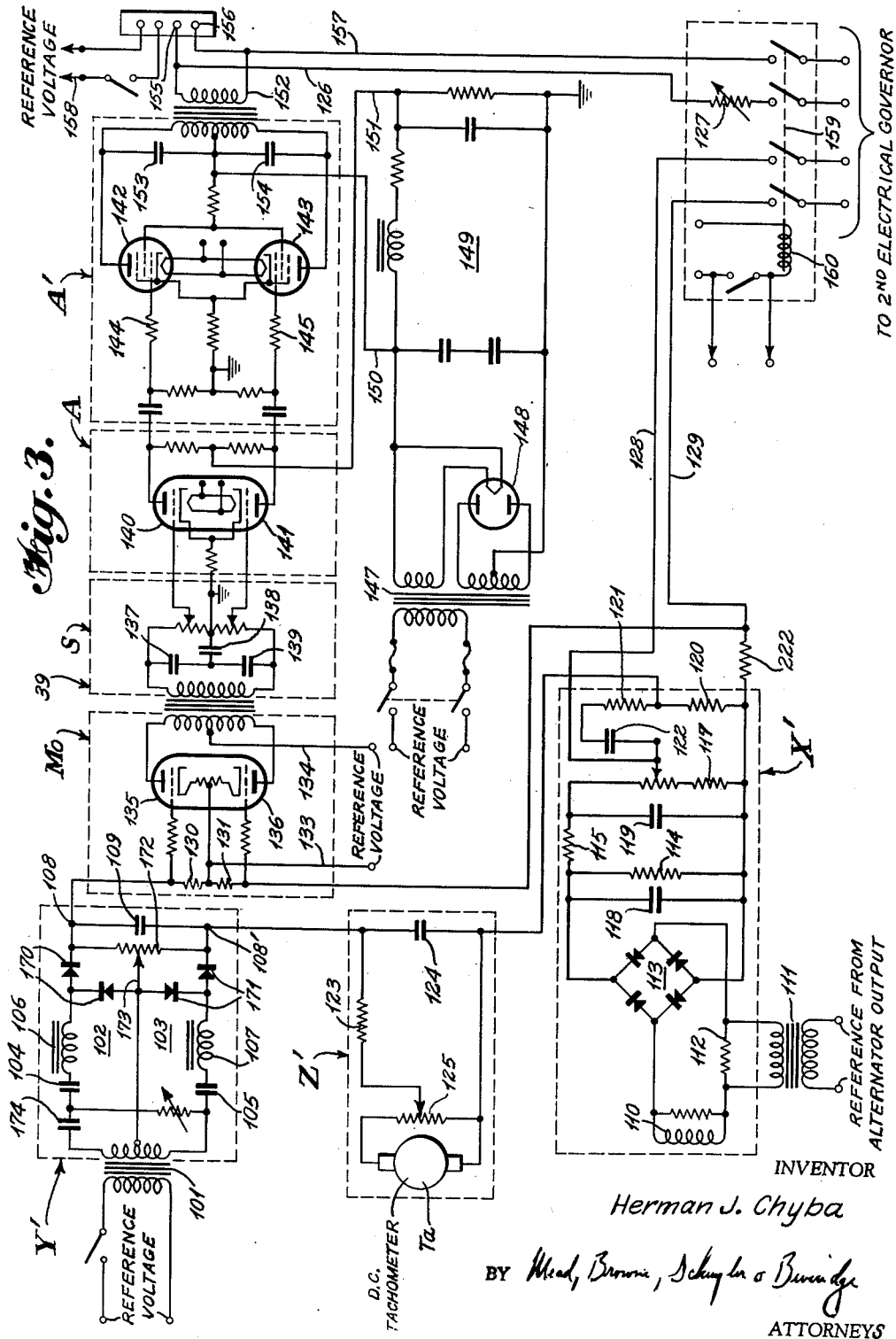

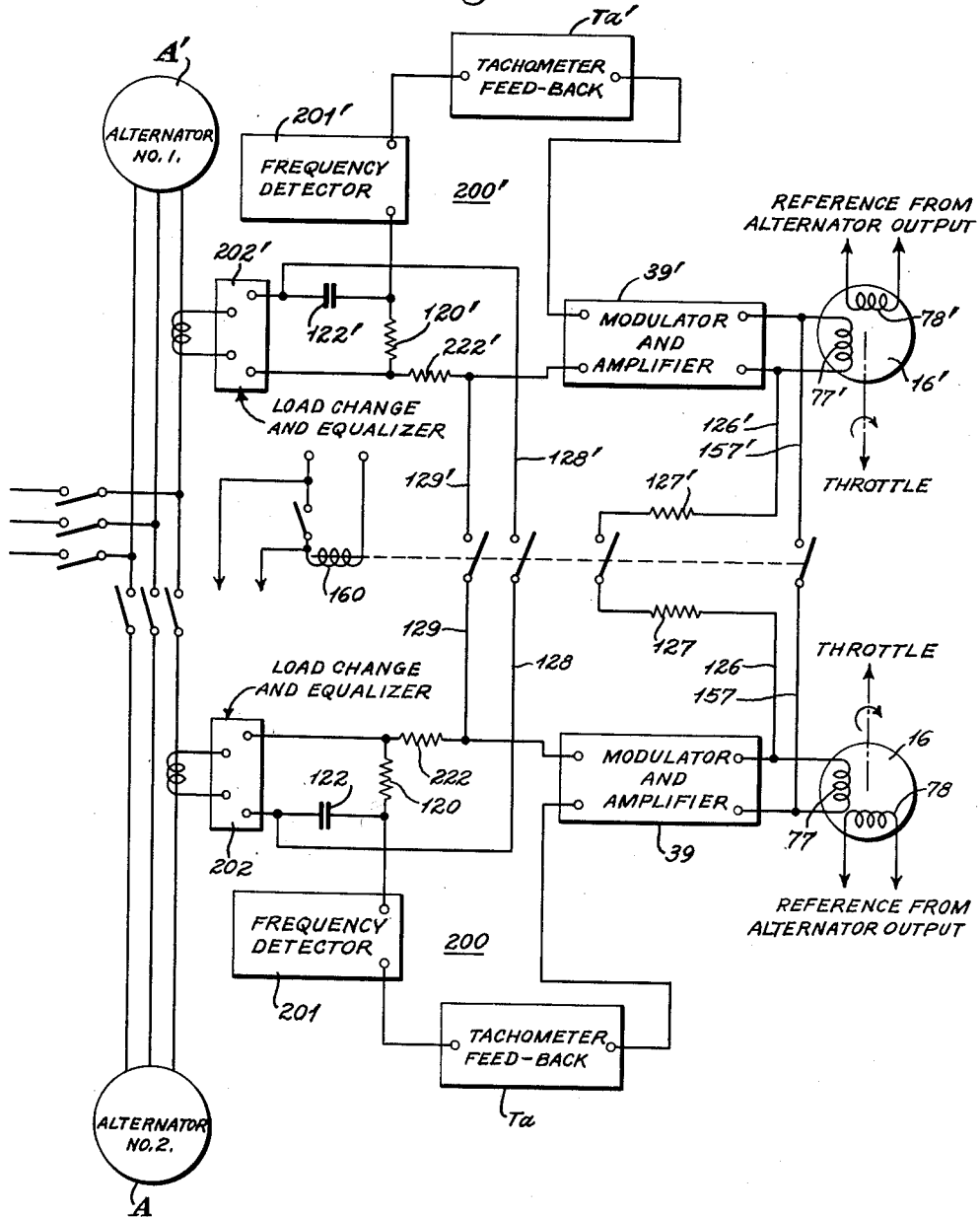

2,780,733

METHOD AND APPARATUS FOR CONTROLLING ALTERNATORS

Herman J. Chyba, Parkville, Md., assignor to Aeronca Manufacturing Corporation, Middletown, Ohio, a corporation of Ohio Application March 25, 1955, Serial No. 496,856

12 Claims. (Cl. 290—4)

This invention relates to methods and apparatus for controlling alternators and more particularly to such methods and apparatus whereby the frequency of an alternating current generator subjected to a fluctuating load may be maintained at a substantially constant predetermined frequency.

As is well known, when a sudden change in load occurs in an electrical power system supplied by one or more alternating current generators, the load change can result in a change in alternator speed. A change in alternator speed results in a change in the system frequency which can be objectionable if allowed to persist for too long a time. Known methods and apparatus for meeting this problem tend to suffer the objection that they do not maintain a sufficiently fine degree of frequency control because of lack of sensitivity and undue delay in responding to the frequency variations.

The present invention is directed to the problem of maintaining a substantially constant predetermined alternator frequency despite changes in load in the systems supplied by the alternator. Methods and apparatus according to the teaching of the present invention have especial utility where a fine degree of frequency control is required. Furthermore, methods and apparatus according to the teaching of the present invention may be said to approach the ideal of being able to anticipate variations in system load and to act to compensate for these variations substantially instantaneously.

It is therefore an object of the present invention to provide new and improved methods and apparatus for controlling alternators whereby a substantially constant predetermined alternator frequency may be maintained.

It is another object of the present invention to provide such methods and apparatus whereby a substantially constant predetermined frequency may be maintained in an electrical power system despite fluctuations in load in said system.

It is a further object of the present invention to provide such methods and apparatus whereby a substantially constant predetermined frequency may be maintained for a plurality of alternators operating in parallel.

Briefly described, a preferred practice according to the teaching of the present invention comprises controlling alternator speed (and hence frequency) by controlling the amount of fuel supplied to the prime mover which is driving the alternator. A first signal is derived from the electrical power system supplied by the alternator, said first signal being proportional to the rate of change of the inphase component of the load current in the system and a second signal is derived from said system which is proportional to the difference between the desired frequency and the actual frequency of the system. These two signals are combined and the combined signal opposed by damping signals which minimize hunting. The net resultant force is applied to the prime mover throttle to control said throttle.

A preferred embodiment of apparatus according to the teaching of the present invention comprises circuit means for deriving a first signal which is proportional to the rate of change of the inphase component of the load current and means for deriving a second signal which is proportional to the difference between the desired frequency and the actual frequency of the alternator. These signals are combined in an electrical circuit and fed into an amplifier which has an output connected to a throttle operating servomotor. To minimize hunting, means are provided to produce another signal proportional to the rate of frequency change and still another signal proportional to the actual throttle movement. These other signals are combined in an electrical circuit in opposition to the first named signal to effectively damp throttle movement and provide for increased stability of the control apparatus.

One type of amplifier employed is a magnetic amplifier which provides an extremely rugged system for use in applications where shock and vibration may be encountered. Another type of amplifier which may be employed is an electron tube amplifier which provides a highly sensitive control apparatus. Other objects and advantages of the present invention will become more apparent from the following detailed description taken in conjunction with the attached drawings in which:

Fig. 1 is a diagram of a circuit embodying the present invention, comprising means for maintaining the frequency of a single alternating current generator;

Fig. 2 is a detail view of the magnetic amplifier shown diagrammatically in Fig. 1;

Fig. 3 is a diagram of a circuit employing an electron tube amplifier, an alternative embodiment to Fig. 1; and Fig. 4 is a block diagram of a paralleling circuit embodying the present invention.

As shown in Fig. 1, the alternator 11 is driven by prime mover 12 to feed a load L through transmission lines 13, 14, 15. To control the frequency of alternator 11, the control means of this invention adjusts throttle T (shown diagrammatically) of the prime mover 12 through servomotor 16 in response to a signal supplied by the system. Throttle T is geared to servomotor 16 and tachometer Ta (shown diagrammatically), the function of which will be later described.

Input circuit designated generally X is utilized to produce a signal proportional to the rate of change in the power supplied by the alternator 11. This circuit functions to sense an increase or decrease in the power demanded by the load prior to a change in the frequency of the system due to a slowing down or speeding up of the alternator driving prime mover.

Series connected voltages are derived from current transformer 110 connected in the transmission line 15, and from transformer 111 which is supplied from transformer 67 connected across the lines 13, 15, provide the excitation for circuit X. Transformer 110 produces a secondary voltage proportional to and in phase with the current supplied to the load, while the voltage produced across the secondary of transformer 111 is proportional to and in phase with line-to-line voltage. A compensation for load power factor is provided by exciting circuit X with series connected voltages out of phase by the power factor angle.

Circuit X comprises a rectifier 113, an output resistor 114, and a filter circuit 115, 119, which combine to rectify and filter the current set up in resistor 114 by the exciting voltages. Derivative circuit made up from capacitor 122 and resistor 120 is connected across the output of the circuit and serves to produce a D. C. voltage across resistance 120 proportional to the rate of change of the circuit X output voltage and, therefore, proportional to the rate of change of the inphase component of the load current. This voltage is applied to magnetic amplifier 38 thru leads 61 and 61' in series with the output of the circuit designated generally Y.

A signal proportional to the difference between the frequency desired and the operating frequency of the alternator is developed in circuit Y. The primary of exciting transformer 101 is connected across the line through leads 28, 29 and transformer 67 to produce a secondary voltage which is applied to resonant circuits 102, 103, one of which is tuned for resonance above and the other of which is tuned for resonance below the desired frequency. The voltages derived from the outputs of the tuned resonant circuits 102, 103 are impressed across resistance 172 in such a fashion as to cancel at the desired frequency. A voltage is produced across resistance 172 when the frequency of the system is above or below that desired, dependent for magnitude and polarity upon the nature and extent of the variation.

The current set up in resistance 172 by the opposed voltages is rectified by the rectifier 170, 171 and filtered by integrating capacitance 169. By the adjustment of tap 173 on resistance 172 the voltage pulses derived from the resonant circuits can be made equal in amplitude to correct for lack of precise tuned circuit symmetry.

There is voltage phase shift, however, in both tuned circuits which is a function of frequency. Therefore, at the desired frequency when one tuned circuit is above resonance while the other tuned circuit is below resonance, the two voltage pulses will be shifted in phase unequal amounts. The capacitance 174 is provided to shift the phase of the voltage applied to resonant circuit 102 to make the voltage pulses across resistance 172 appear exactly 180° out of phase at the desired frequency. The voltage across resistance 172 is applied to the filter capacitance 109, which operates to smooth out irregularities in the form of the D. C. voltage wave. Voltage divider 35 comprising series connected resistance portions 35', 35" is connected across filtering capacitance 109 to provide a signal magnitude varying means. The voltage appearing across portion 35' is connected in series with the signal derived for circuit X and applied to amplifier 38 through leads 61, 61'.

Circuit designated generally Z is utilized as a damping means for the control system and comprises a means for feeding back a signal proportional to the total movement of throttle T. A voltage proportional to the output current of tachometer Ta is produced at terminals 36, 37 on resistance 125, which resistance 125 is connected across the brushes of the tachometer Ta. By providing an adjustable tap on resistance 125, the magnitude of the derived voltage may be varied as desired, thereby providing a means to increase or decrease the effect of the tachometer Ta derived signal in the control system. The signal voltage derived from across resistance 125 is fed into amplifier 38 by means of leads 62, 62'.

In the embodiment of this invention shown in Fig. 1, the control system comprises a plurality of input circuits (X, Y, Z) feeding into a magnetic amplifier 38 shown in detail in Fig. 2.

Two means for eliminating hunting and for stabilizing are present in the system shown in Fig. 1, the first of these means being presented by circuit Z. Input windings 52 of amplifier 38 (shown in Fig. 2) are connected by means of leads 62, 62' across resistance 125. As these windings have a high inductance the current in the windings is proportional to the integral of the applied voltage. The signal voltage across resistance 125 being proportioned to the rate of throttle T movement, the current in the input windings 52 (and flux produced) is proportional to the total throttle movement.

The second of these means is presented by differentiating the signal voltage derived from circuit Y with the series R. C. circuit consisting of resistance 35' and capacitance 32, and applying this differentiated voltage in series with the voltage derived from circuit X to windings 51 of magnetic amplifier 38 through leads 61, 62'. The signal voltage appearing across resistance portion 35', then is proportional both to the difference between the operating frequency and the frequency desired, and, to the rate of change of this same voltage. The circuit is arranged whereby the instantaneous polarity of these signals is opposed whereby the signal derived and impressed in circuit X through leads 41, 61 is proportional to the difference between these signals.

The signal across the resistance portion 35' is proportional to the magnitude and rate of change of the signal voltage appearing across the terminals 108, 108', which signal voltage is proportional to the difference between the operating frequency of the alternator and the frequency desired. By deriving a signal proportional to the rate of frequency change and feeding this signal into the amplifier so as to oppose a signal tending to change the throttle T position, a stabilizing means is provided serving to compensate for the instability in the system due to the slow response characteristics of the magnetic amplifier.

The D. C. signals derived from circuits X and Y are additively fed into amplifier 38 and the D. C. signal derived from circuit Z is fed into amplifier 38 in such a fashion as to oppose the combined circuit X and Y signals. Under normal conditions, when the frequency fluctuation of the system is very slight, circuit Y producing a signal proportional to the difference between the operating frequency and that desired will regulate the positioning of throttle T and the signal from circuit X will be non-effective. When a change in load occurs, the circuit X produces a signal tending to maintain the prime mover at its proper speed, circuit Z functioning under both conditions to stabilize the system by eliminating hunting. The additional stabilizing signal produced across resistance 35' and fed into the amplifier in addition to the frequency deviation signal in series with the output from circuit X functions to compensate for the slow response of the magnetic amplifier circuit.

Referring to Fig. 2, a magnetic amplifier of a well known type designed for use with the control system of the present invention is shown comprising stage I input windings 51, 52 excited by the D. C. signals produced by circuits X, Y, Z, respectively. Magnetic amplifiers operate by varying the reluctance of a magnetic circuit in accordance with the signals to be amplified. Large amounts of power may be regulated by an output or anode winding since the impedance of the winding varies as a function of the reluctance of its magnetic circuit.

Input circuits X, Y, Z are applied to terminals 61, 61' and 62, 62' respectively, of the magnetic amplifier 38. D. C. bias coils 57 of stage I are excited by a signal derived from rectifier 64 and serve to fix the operating point of the amplifier, and resistance 65 with an adjustable tap 66 provides a means whereby the D. C. bias may be varied in order to secure the operating condition desired.

Transformer 67 is excited from across transmission lines 13, 15 (not shown in Fig. 2) through leads 68, 68'. Secondary windings 69, 70, 71 of transformer 67 constitute the power supply for stages I and II of the amplifier, secondary winding 69 having connections to stage I anode windings 54, secondary winding 70 having connections to stage II anode windings 56, and secondary winding 71 having connection to stage I D. C. bias supply rectifier 64.

Connections 72 from stage I anode windings 54 transmit the output signals from stage I to input windings 55 of stage II. Anode windings 56 of stage II are connected in a circuit including transformer 73 and condenser 74, the condenser 74 serving as a means for adjusting the phase of the voltage applied ot the transformer 73, and therefore the voltage output of the amplifier.

The output or control signal from transformer 73 is transmitted through leads 76 and 76' to field winding 77 of servomotor 16. Resistance 75 is connected across the secondary of transformer 73 to function as a dynamic brake for the servomotor 16 when there is no output from magnetic amplifier 38.

Winding 78 of servomotor 16 is excited by a voltage derived from transformer 67, while winding 77 of servomotor 16 receives an alternating current signal 90° out of phase with the winding 78 voltage, varying in magnitude in accordance with the signals derived from circuits X, Y, Z. Servomotor 16 therefore, will be driven in accordance with the amplifier 38 output, the control signal, at a speed dependent upon the magnitude of the voltage applied to coil 77 and in a direction, clockwise or counterclockwise, depending on the instantaneous polarity of the signal.

In Fig. 3 a circuit embodying the present invention is shown in combination with an electron tube amplifier 39.

This embodiment includes three input circuits (designated X', Y', Z'), an amplifier 39, and a servomotor 16 for controlling a gear train connected to the throttle means T, the excitation for the servomotor 16 being derived both from the output of the amplifier and directly from the alternator output, to provide the frequency control.

Circuit X' produces a signal proportional to the rate of change of the inphase component of the load current. Current transformer 110 produces a voltage proportional to the load current, which is impressed in series with the load voltage derived from transformer 111 and resistance 112, producing current rectified by rectifier 113. The current produced is filtered and differentiated in a conventional manner by the filter circuit including resistances 114, 115, 116, 117 and capacitances 118, 119 and differentiating circuit including resistances 120, 121 and capacitance 122 so as to provide a signal across resistance 120 proportional to the rate of change of the filtered current. By the addition of the load voltage across resistance 112 to a voltage in phase with the load current and proportional thereto, the rate of change of the inphase component of the load current is obtained as explained in connection with Fig. 1.

Circuit Y' is excited from the output of the alternator. Line-to-line voltage is impressed across transformer 101, the secondary voltage of which is applied to tuned resonant circuits 102, 103 comprising condensers 104, 105 and inductances 106, 107. Resonant circuit 102 is tuned to a frequency above the desired frequency by an amount equal to that by which resonant circuit 103 is tuned below, so as to produce a voltage at terminals 108, 108', dependent in polarity and magnitude upon the variance between the desired and operating frequencies.

Rectifiers 170, 171 rectify the current set up in resistance 172 by the opposed voltages derived from resonant circuits 102, 103. Variable tap 173 is provided to adjust the opposed voltages and make the voltage pulses derived from the resonant circuits equal in magnitude, so as to cancel, at the desired frequency.

As was set forth in connection with the control network shown in Fig. 1, the voltages derived from each tuned circuit are shifted in phase unequal amounts. Condenser 174 compensates for the unequal phase shift, and provides a means whereby the voltage pulses across resistance 172 may be made to appear exactly 180° out of phase.

Condenser 109 is connected across terminals 108, 108' and operates to smooth out the D. C. signal derived from the circuit.

Circuit Z' produces a voltage proportional to the total movement of the prime mover fuel controlling throttle. This is accomplished by impressing the output of tachometer Ta', which is in the gear train of the throttle T, across a resistance 125. By the use of a tap on resistance 125, an adjustment of the voltage is provided so as to permit control of the magnitude of the voltage impressed across the conventional integrating circuit composed of resistance 123 and capacitance 124, the voltage across capacitance 124 being proportional to the total movement of the throttle T.

The voltages derived from circuits X', Y' and Z' are additively impressed across resistances 130, 131 of modulating circuit Mo which constitutes the first stage of amplifier 39 in such a fashion that the voltage from circuit Z' is opposed to the combined voltages from circuits X' and Y'.

The voltage across the primary of transformer 132 will be in phase with the reference voltage supplied to circuit Mo through leads 133, 134 and the magnitude of the voltage derived from the push pull arrangement of the two tubes 135, 136 will vary in accordance with the impressed voltage. The secondary voltage of transformer 132 is shifted 90° in phase by circuit S, including condenser 138, and amplified by circuit A comprising the push pull arrangement of tubes 140, 141. Circuit A is directly coupled to circuit A', comprising tubes 142, 143 and resistances 144, 145. The power supply for amplifier 39 is fed through leads 150, 151 into circuit A' and comprises transformer 147, double diode 148, and filter circuit 149 operating in a conventional manner to provide direct current from the A. C. power source.

The output of amplifier 39 is impressed across the control signal transformer 152. Capacitances 153, 154 are provided to eliminate harmonics in the output by resonating the two input sections of transformer 152.

For control of a single alternator the output of amplifier A' is impressed across one winding of a 2-phase servomotor, the other phase winding being supplied by a voltage 158 derived from the alternator output. Circuit S, by shifting the phase of the amplifier circuit voltage, provides a signal in proper phase relation for the operation of a motor of this character, the speed and direction of rotation being determined by the magnitude and polarity of the voltage at terminals 155, 156 derived from the control system.

In normal operation, using either a control system of the invention with a magnetic amplifier such as that shown in Fig. 1 or with a tube amplifier such as that shown in Fig. 3, the frequency detector circuit predominates and provides a control of high sensitivity. Upon the occurrence of an increase or decrease in load, the circuit produces a pre-sensing signal proportional to the rate of change of inphase load current and acts to rapidly readjust the throttle to govern the prime mover before the load change affects the speed of the prime mover, thus maintaining the alternator at the desired frequency. As the mechanical inertia of large rotating machinery encountered in power generation is usually greater than the electrical inertia of the system being supplied, a substantial increase or decrease in the load current will occur prior to a resulting slowing down or speeding up of the alternator to compensate for the load change. It is the introduction of this pre-sensing means that makes possible in substantial degree the extremely rapid response achieved by use of the control of this invention.

The introduction of a signal derived from the tachometer Ta provides an additional stabilizing effect in the control system. As the signal is determined by the movement of throttle T and is of a polarity tending to oppose substantial movement of said throttle T, hunting is eliminated due to the damping effect.

Although the present system is disclosed as incorporating a servomotor M of 2-phase type for positioning the throttle T, it is apparent a different positioning device capable of responding to the signal derived from a control system embodying the present invention may be utilized for regulating the fuel supplied or in the case of a turbine or steam engine the power supplied to the alternator driving prime mover. The term "throttle" as used in the claims has this connotation.

In Fig. 4 a system embodying the present invention is disclosed as applied to a plurality of alternators in parallel operation.

The output of system 200, controlling the prime mover which drives alternator A is impressed on one winding 77 of a throttle driving 2-phase motor 16.

As described in connection with the single alternator system of Fig. 1, the input to amplifier 39 comprises a direct current signal derived from tachometer Ta proportional to the total movement of the prime mover fuel controlling throttle, a direct current signal proportional to the variance in frequency from that desired and the rate of change in frequency derived from the frequency detector 201, and a direct current voltage proportional to the rate of change of the inphase component of the load current derived from the load change detector 207.

Similarly, the input to amplifier 39' comprises direct current signals derived from the frequency detector 201', load change detector 202' and tachometer Ta', with the output of the system 200' driving a throttle positioning motor 16' which controls the fuel fed to the prime mover which drives alternator A'.

The loop including the output of load change detectors 202 and 202', resistors 222 and 222', lines 128, 129 provides a control means for regulating the distribution of total load between the alternators. The voltage output of 202 is proportional to the inphase component of the load current delivered by alternator A, while the voltage output of 202' is proportional to the inphase component of the load current delivered by alternator A'. These voltages are unequal when the load is unequally shared, and a circulating current flows producing a voltage across resistance 222 in system 200 and a voltage across resistance 222' in system 200'.

The voltages across resistance 222 and 222' are of a polarity and magnitude which will tend to correct the unbalanced sharing of the load between the alternators, and are added to the signals derived from the input circuits incorporated in the control system and fed into the amplifier, the output of which constitutes the control signal. Should alternators having different kilovolt ampere ratings be operated in parallel, circuits 202 and 202' may be internally adjusted so that no differential will exist when the load is shared according to the kilovolt ampere ratings of the alternators. As the distribution of load between a plurality of alternators in parallel operation under normal conditions may vary from the desired sharing in proportion to their kilovolt ampere ratings, by the control of the present invention proper distribution may be effected in conjunction with control over frequency.

The loop including lines 126, 126', 157, 157' and resistors 127, 127' performs a stabilizing function by damping the servomotor motion during hunting conditions. When motor fields 77 and 77' receive signals from amplifiers 39 and 39' of the same phase, that is, to cause both throttle operators to move in the same direction, the sensitivity and response of the two systems is very good. However, when the motor fields 77 and 77' receive signals of the opposite phase, a condition that obtains during system hunting, a large circulating current flows thru the loop including resistors 127, 127' and the sensitivity of both servomotors is reduced considerably. Thus rapid motion of the throttles in opposite direction is prevented and system hunting is effectively damped. Resistors 127, 127' are dynamic breaking resistors.

By the introduction of this stabilizing signal the two systems are maintained in close harmony during a substantial change in load conditions.

Referring to Fig. 3, lines 157, 126, with resistance 127 and lines 128, 129, provide the paralleling connections for use in parallel alternator operation as described in connection with Fig. 4. Switching means 159 with remote or local control through solenoid 160 may be provided in the manner shown. Obviously, with additional connections, provision may be made for paralleling more than two alternators, in which case an additional control system for the prime mover of each alternator would be utilized.

Fig. 4 shows the present invention applied to a plurality of alternators when employing the vacuum tube system shown in Fig. 3. The magnetic amplifier system shown in Fig. 1 operates equally well with a plurality of alternators. The paralleling interconnections for the magnetic amplifier system are numbered similarly in Fig. 1 and perform the same function as described for lines 128, 129 and 126, 157 in conjunction with resistor 127 in Fig. 3.

While I have described and illustrated embodiments of my invention, I wish it to be understood that I do not intend to be restricted solely thereto but that I do intend to cover all modifications thereof which would be apparent to one skilled in the art and which come within the spirit and scope of my invention.

What I claim as my invention is:

1. An apparatus useful for controlling the throttle of a prime mover driving an alternator to maintain the alternator frequency at a substantially constant predetermined frequency despite fluctuations in the load supplied by the alternator, said apparatus comprising an electrical motor connectible to the prime mover throttle to move said throttle, a circuit for producing a voltage proportional to the rate of change of the inphase component of the load current supplied by the alternator, a circuit for producing a voltage proportional both to the difference between the operating frequency of the alternator and the predetermined alternator frequency and to the rate of change of said difference, means connected to said circuits to combine said voltages to produce a resultant voltage, and means connecting said combining means to said motor to apply said resultant voltage to said motor to energize said motor.

2. An apparatus useful for controlling the throttle of a prime mover driving an alternator to maintain the alternator frequency at a substantially constant predetermined frequency despite fluctuations in the load supplied by said alternator, said apparatus comprising means connectible to said throttle to move said throttle, a first means to produce a voltage proportional to the rate of change of the inphase component of the load current supplied by the alternator, a second means to produce a voltage proportional both to the difference between the operating frequency of the alternator and the predetermined alternator frequency and to the rate of change of said difference, a third means to produce a damping voltage, means connected to said first, second and third means to combine the voltages produced by said first, second and third means to produce a resultant voltage, and means connecting said combining means to said throttle moving means to apply said resultant voltage to said throttle moving means to actuate said throttle moving means.

3. An apparatus useful for controlling the throttle of a prime mover driving an alternator to maintain the alternator frequency at a substantially constant predetermined frequency despite fluctuations in the load supplied by the alternator, said apparatus comprising an electrical motor, an amplifier having output leads connected to said motor to energize said motor in accordance with the amplifier output, a first circuit for producing a voltage proportional to the rate of change of the inphase component of the load current supplied by the alternator, and a second circuit for producing a voltage proportional both to the difference between the operating frequency of the alternator and the predetermined alternator frequency and to the rate of change of said difference, said circuits being connected in series to provide a series circuit having output leads, said amplifier having input leads connected to said series circuit output leads whereby the series circuit output is fed into said amplifier.

4. An apparatus useful for controlling the throttle of a prime mover driving an alternator to maintain the alternator frequency at a substantially constant predetermined frequency despite fluctuations in the load supplied by said alternator, said apparatus comprising an electrical motor connectible to the prime mover throttle to move said throttle, an amplifier having input leads and output leads, means connecting said output leads to said motor to energize said motor in accordance with the amplifier output, a first circuit for producing a first voltage proportional to the rate of change of the inphase component of the load current supplied by the alternator, a second circuit for producing a second voltage proportional both to the difference between the operating frequency of the alternator and the predetermined alternator frequency and to the rate of change of said second voltage, said first and second circuits being connected in series to provide a series circuit having output leads, input leads of said amplifier being connected to said series circuit output leads, and a damping circuit for producing a damping voltage proportional to actual movement of said prime mover throttle, said damping circuit having output leads and input leads of said amplifier being connected to said damping circuit output leads whereby the series circuit voltage and said damping circuit voltage are input voltages to said amplifier, the output voltage of said amplifier being applied to said electrical motor to energize said motor.

5. An apparatus according to claim 4 wherein said second circuit includes one resonant circuit tuned for resonance above the predetermined alternator frequency and another resonant circuit tuned for resonance below the predetermined frequency.

6. An apparatus according to claim 4 wherein the voltages produced by said first and second circuits are D. C. voltages, and the amplifier is a magnetic amplifier.

7. An apparatus useful for maintaining a substantially constant predetermined frequency and predetermined alternator load sharing in an electrical power system supplied by a plurality of alternators connected in parallel, each alternator being driven by a prime mover having a movable control throttle, said apparatus comprising a plurality of control networks, each control network including a throttle moving means connectible to a prime mover throttle, a first circuit for producing a voltage proportional to the rate of change of the inphase component of load current supplied by an alternator, a second circuit for producing a voltage proportional to the difference between the operating frequency and the predetermined frequency of an alternator, means to combine said voltages to produce a resultant voltage, and means connecting said combining means to said throttle moving means to apply said resultant voltage to said throttle moving means to actuate said throttle moving means; and a loop circuit common to all of said control networks, said loop circuit including the circuit in each control network which produces a voltage proportional to the rate of change of the inphase component of the load current supplied by an alternator whereby the predetermined alternator load sharing may be maintained.

8. An apparatus useful for maintaining a substantially constant predetermined alternator frequency and predetermined alternator load sharing in an electrical power system supplied by a plurality of alternators connected in parallel, each alternator being driven by a prime mover having a movable control throttle, said apparatus comprising a plurality of control networks, each control network including an electrical motor connectible to a prime mover throttle, an amplifier having input leads and output leads, said amplifier output leads being connected to said motor to energize said motor in accordance with the amplifier output, a first circuit for producing a voltage proportional to the rate of change of the inphase component of load current supplied by an alternator, and a second circuit for producing a voltage proportional to the difference between the operating frequency and the predetermined frequency of an alternator, said first and second circuits being connected in series to provide a series circuit having output leads, input leads of said amplifier being connected to said series circuit output leads; and a loop circuit common to all of said control networks, said loop circuit including the circuit in each control network which produces a signal proportional to the rate of change of the inphase component of the load current supplied by an alternator whereby the predetermined alternator load sharing may be maintained.

9. An apparatus useful for maintaining a substantially constant predetermined alternator frequency and predetermined alternator load sharing in an electrical power system supplied by a plurality of alternators connected in parallel, each alternator being driven by a prime mover having a movable control throttle, said apparatus comprising a plurality of control networks, each control network including a first circuit for producing a first voltage proportional to the rate of change of the inphase component of load current supplied by an alternator, a second circuit for producing a second voltage proportional to the difference between the operating frequency and the predetermined frequency of an alternator, a third circuit for producing a damping voltage proportional to movement of a prime mover throttle, means to combine said first, second and damping voltages to produce a resultant voltage, a throttle moving means, and means connecting said combining means to said throttle moving means to apply said resultant voltage to said throttle moving means to actuate said throttle moving means; and a loop circuit common to all of said control networks, said loop circuit including the circuit in each control network which produces a signal proportional to the rate of change of the inphase component of the load current supplied by an alternator whereby the predetermined alternator load sharing may be maintained.

10. An apparatus according to claim 9 wherein there is a second loop circuit common to all of said control networks, said second loop circuit including the circuit in each control network which produces a damping voltage.

11. The method of maintaining the frequency of an alternator at a substantially constant predetermined frequency which comprises driving said alternator by a prime mover having a movable control throttle, producing a voltage which is proportional to the rate of change of the inphase component of load current supplied by said alternator, producing a voltage which is proportional both to the difference between the operating frequency of the alternator and the predetermined alternator frequency and to the rate of change of said difference, combining said voltages to produce a resultant voltage, converting said resultant voltage into a force proportional to said resultant voltage, and applying said force to said prime mover throttle to control said throttle.

12. The method of maintaining the frequency of an alternator at a substantially constant predetermined frequency which comprises driving said alternator by a prime mover having a movable control throttle, producing a first voltage which is proportional to the rate of change of the inphase component of the load current supplied by the alternator, producing a second voltage which is proportional both to the difference between the operating frequency of the alternator and the predetermined alternator frequency and to the rate of change of said difference, producing a damping voltage which is proportional to actual movement of the prime mover throttle, combining said first, second and damping voltages to produce a resultant voltage, converting said resultant voltage into a force, and applying said force to the prime mover throttle to control said throttle.

References Cited in the file of this patent

UNITED STATES PATENTS 2,558,729    Buechler               July 3, 1951